No. 615,078. Patented Nov. 29, 1898.
W. L. LUBBOCK.
FISHING FLOAT.
(Application filed Apr. 22, 1898.)
(No Model.)
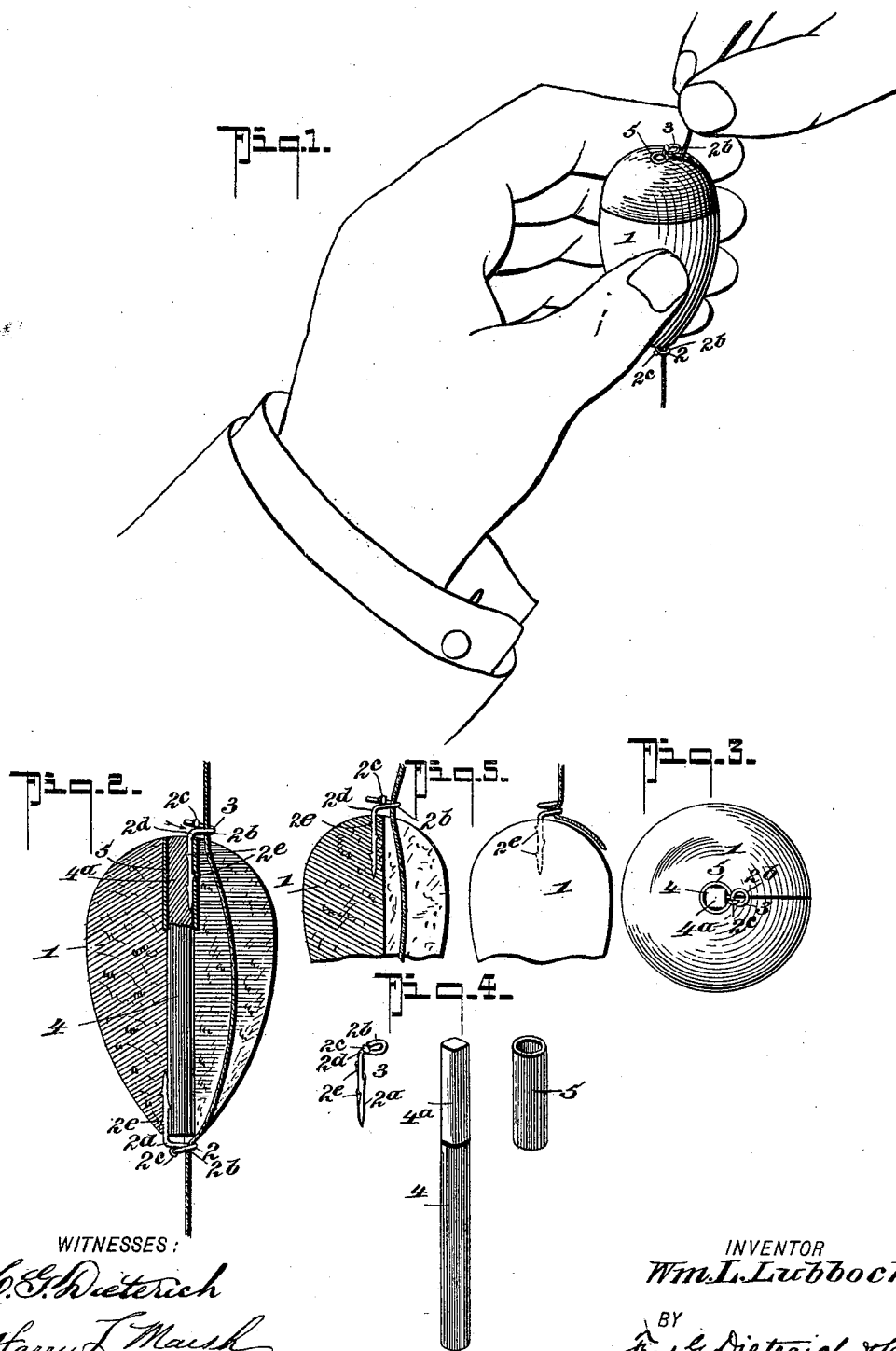
WITNESSES:
H. G. Dieterich
Harry L. Marsh
INVENTOR
Wm. L. Lubbock.
BY
Fred G. Dieterich & Co.
ATTORNEYS

UNITED STATES PATENT OFFICE.

WILLIAM LOCKHART LUBBOCK, OF AUSTIN, TEXAS, ASSIGNOR OF ONE-HALF TO R. H. CONNERLY AND F. T. CONNERLY, OF SAME PLACE.

FISHING-FLOAT.

SPECIFICATION forming part of Letters Patent No. 615,078, dated November 29, 1898.

Application filed April 22, 1898. Serial No. 678,493. (No model.)

*To all whom it may concern:*

Be it known that I, WILLIAM LOCKHART LUBBOCK, residing at Austin, in the county of Travis and State of Texas, have invented a new and Improved Fishing-Float, of which the following is a specification.

This invention, which relates to improvements in fishing-tackle, has for its object to provide a novel float line-attaching means whereby the float can be conveniently and quickly attached to any desired position on the line without disconnecting the line from the rod or the sinker from the line.

This invention also comprehends a novel attaching means whereby the same can be quickly detached from one position on the float in case it becomes loose by ordinary wear and quickly and securely attached to another point on the float without the use of bands, wrapping, or other attaching means for holding it to its set position.

This invention consists in the novel features and combination of parts first described in detail and then specifically pointed out in the appended claims, reference being had to the accompanying drawings, in which—

Figure 1 is a view illustrating my invention and its manner of use. Fig. 2 is a vertical section of the float, taken through the lines slit and showing the attachments or guides secured in place. Fig. 3 is a top view of the float. Fig. 4 illustrates the several parts constituting my improvements detached, and Fig. 5 is a detail view illustrating the simplest form of my invention.

My improvements relate more particularly to that class of floats having wire guides fitted to the opposite ends of the float. Heretofore the common way of applying such guides has been to insert them either alongside the spindle or stem which passes through the float and securing them by wrapping their free ends to the stem or by forming the guides of a single wire rod passed entirely through the float and provided with straight or spiral eyes at their ends. The first form of attachment referred to is open to the objection that in case the float by constant use slightly rots and the fastener-eyes become loosened in their connection therewith such eyes will slide upon the stem and can then only be made secure by a new wrapping, which in time and labor frequently exceeds in cost the price of the new float, not to mention the inconvenience to the user, and in the second form the results are not all that is desired, in that the fitting of the rod through the float and the subsequent bending of one or both ends, renders the making thereof costly, and, furthermore, should the rod wear loose within the float the same cannot be readily held from slipping or moving lengthwise therein.

My invention differentiates from the several forms of floats specified. First, it provides for a quick and inexpensive means of providing guides for the float; second, it dispenses with wrapping or other exterior means for making the guides fast to the float; third, it provides for an instantaneous removal of the guides from one point of the float in case they become loose by wear and fitting them to another point to make its connection very lasting and secure, and, fourth, it provides a detent for positively holding the line from accidentally becoming disconnected from the guides in ordinary use.

Referring to the accompanying drawings, in which like numbers indicate like parts in all the figures, 1 indicates the float, which has a central or axial aperture and which may be of any approved shape.

2 indicates the lower guide, and 3 the upper guide, which are constructed alike, each consisting of a spring-wire having a binding-penetrating end $2^a$ and having their outer ends bent in a horizontal spiral eye $2^b$, having one convolution, the extreme end terminating in an outer head $2^c$, which is held spring-pressed down against the shoulder $2^d$, whereby to form with the said shoulder $2^d$ a suitable guide for entering the line and in itself a detent for preventing the line during the ordinary use of the float, especially in casting, from slipping out from the eye of the guide.

In the simplest form of my invention the guides have their shanks provided with spurs $2^e$, whereby when inserted in the float-body, as shown in Fig. 5, they will be held from readily pulling out.

In Figs. 1 to 4, inclusive, is illustrated the preferred construction of my invention, by reference to which it will be observed that the spindle or stem 4 is cut off flush with each end of the float, and the upper end of the spindle terminates in a non-circular portion 4ᵃ, the lower or circular portion being fitted tightly by wedging or otherwise.

As the bottom guide receives but a very limited pull strain when in use, it does not as soon wear loose as the upper guide does, and it is inserted between the stem and float and held secure by its barbs engaging such stem and float; but as the upper guide receives a considerable pull, as well as lateral strain, I provide means for producing a tight wedging of the guide-shank against the stem and also for admitting of the frequent changing of the point of attaching said guide to the float. For this purpose a short sleeve (preferably quill) is fitted in the apertures of the float over the upper non-circular end of the stem, the purpose of which is to provide a semisolid bearing for the upper guide and hold it the more securely against the wooden stem 4 than would be accomplished by side pressure of the yielding or cork body.

By referring now more particularly to Fig. 3 it will be seen that by inserting the guide 3 next any one of the square sides of the stem 4 its barbs will be forced of the wood stem and held from connection with the cork body, although it has the tendency to squeeze that part of the tube engaged by the barbs into such cork body.

It is obvious that should the guide become loosened in one bearing it can be made to securely hold its position by insertion in any one of the other bearing portions 4ᵃ.

While I prefer that the sleeve 5 be of quill, yet it may be of any other semirigid or even rigid material.

From the foregoing it will be seen that a very simple and secure means for connecting the float to the line is provided, which will permit the float to be quickly adjusted and freely moved on the line without looping or otherwise making the line secure thereto, it being understood that the line will also be held from passing freely between the guides by engagement with the slit in the float-body.

When it is desired to use my improvements with a non-slitted float, the end of the guide may terminate in a plurality of closely-wound spiral convolutions, so that the line can be slipped between one of them and be held by frictional contact to prevent slipping therein, as indicated in Fig. 5.

Having thus described my invention, what I claim, and desire to secure by Letters Patent, is—

1. In combination with a fishing-float; a line-holding attachment therefor, comprising a body portion having a penetrating shank, and having its upper end formed into a horizontal eye the end of which terminates in a head-like enlargement, held spring-pressed against the eye portion to form a guide and detent, for the purposes described.

2. The combination of the float having a line-guide at the lower end; a plug at the upper end and a sleeve surrounding such plug; of a detachable guide having a penetrating shank adapted to enter between the plug and the sleeve, and having its upper end formed into a spiral eye for the line, as specified.

3. An improved fishing-float, comprising a body formed of cork or springy material, provided with a line-receiving slit; a central stem extending lengthwise thereof and having the upper end terminating in a non-circular portion; a sleeve fitted in the float surrounding the said non-circular stem portion, an eye or guide detachably secured in the lower end of the float adjacent the plug, and an upper guide having a barbed penetrating shank, adapted to be detachably inserted between the sleeves and the stem and having its upper end terminating in a horizontal eye having an opening for the insertion of the line, all being arranged substantially as shown and for the purposes described.

WILLIAM LOCKHART LUBBOCK.

Witnesses:
J. P. BYRNE,
H. C. FISHER.